United States Patent [19]
Standley

[11] Patent Number: 5,540,403
[45] Date of Patent: Jul. 30, 1996

[54] AIRPLANE SEAT CHILD SAFETY HARNESS

[76] Inventor: Jeff W. Standley, 1008 Valle Vista, Vallejo, Calif. 94589

[21] Appl. No.: 345,600

[22] Filed: Nov. 28, 1994

[51] Int. Cl.$^6$ ............................ B64D 25/06; B60R 22/10
[52] U.S. Cl. ...................... 244/122 B; 297/484; 297/465; 24/573.5
[58] Field of Search ............................... 244/121, 122 R, 244/122 B; 297/465, 468, 467, 473, 482, 483, 484, 488, 216; 280/801, 803, 806, 808, 744

[56] References Cited

U.S. PATENT DOCUMENTS

| | | | |
|---|---|---|---|
| 1,310,958 | 7/1919 | O'Connor | 297/484 |
| 1,316,163 | 9/1919 | Kennedy | 297/484 |
| 3,825,979 | 7/1974 | Jakob | 24/573.5 |
| 3,954,280 | 5/1976 | Roberts et al. | 297/484 |
| 4,099,770 | 7/1978 | Elsholz et al. | 297/484 |
| 4,302,049 | 11/1981 | Simpson | 297/467 |
| 4,927,211 | 5/1990 | Bolcerek | 297/465 |
| 4,962,965 | 10/1990 | Glover | 24/573.5 |
| 5,074,588 | 12/1991 | Huspen | 297/484 |

Primary Examiner—Galen L. Barefoot

[57] ABSTRACT

An airplane seat child safety harness comprising: a central buckle formed in a planar configuration and including a coupling device affixed to at least one of its ends, the buckle including at least one bore with a button positioned therein, the coupling devices adapted to couple with seat belt buckle inserts, at least one lower belt having two free ends, one free end being coupled to the central buckle, the lower belts adapted to be positioned through the legs and behind the back of a child; and at least two lap belts each having at least two free ends, one free end being coupled to the central buckle, at least two seat belt rings formed in a tubular configuration and adapted to be coupled with the end of a seat belt buckle, the second free end of the lap belts being coupled to the seat belt buckle rings, each of the belts including length adjustment devices, at least two shoulder straps each having at least one segment and including length adjustment devices, each shoulder strap having two free ends, one free end being coupled to a lap belt, another free end being coupled to the free end of the lower belt.

1 Claim, 4 Drawing Sheets

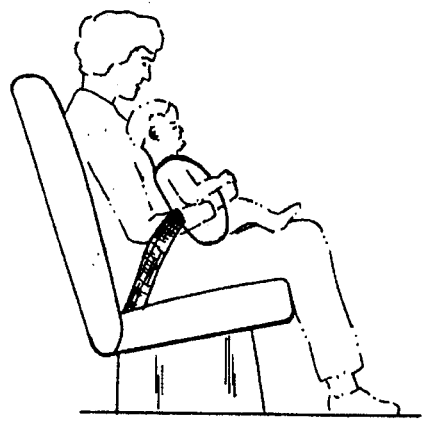
PRIOR ART
FIG. 1
PRIOR ART
FIG. 2
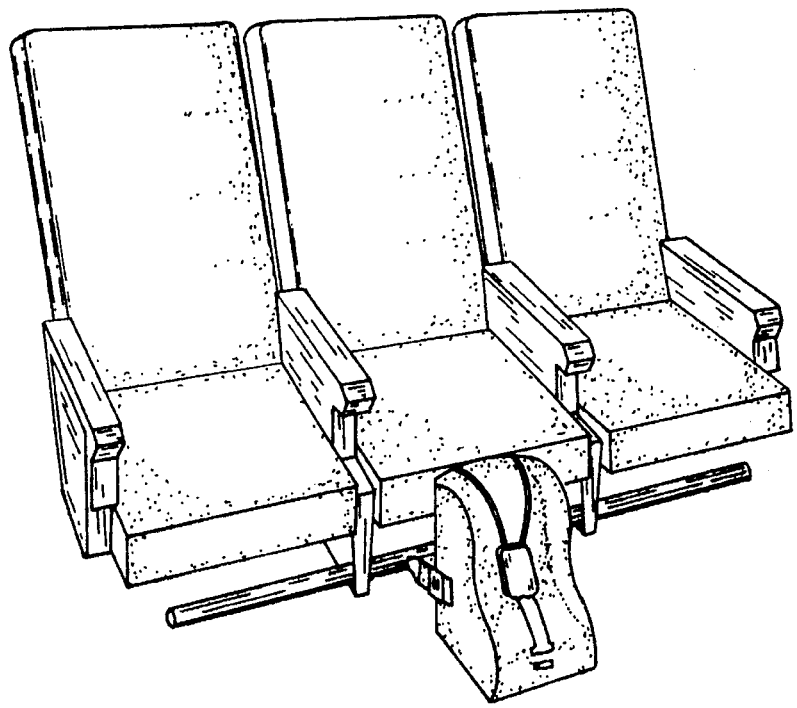

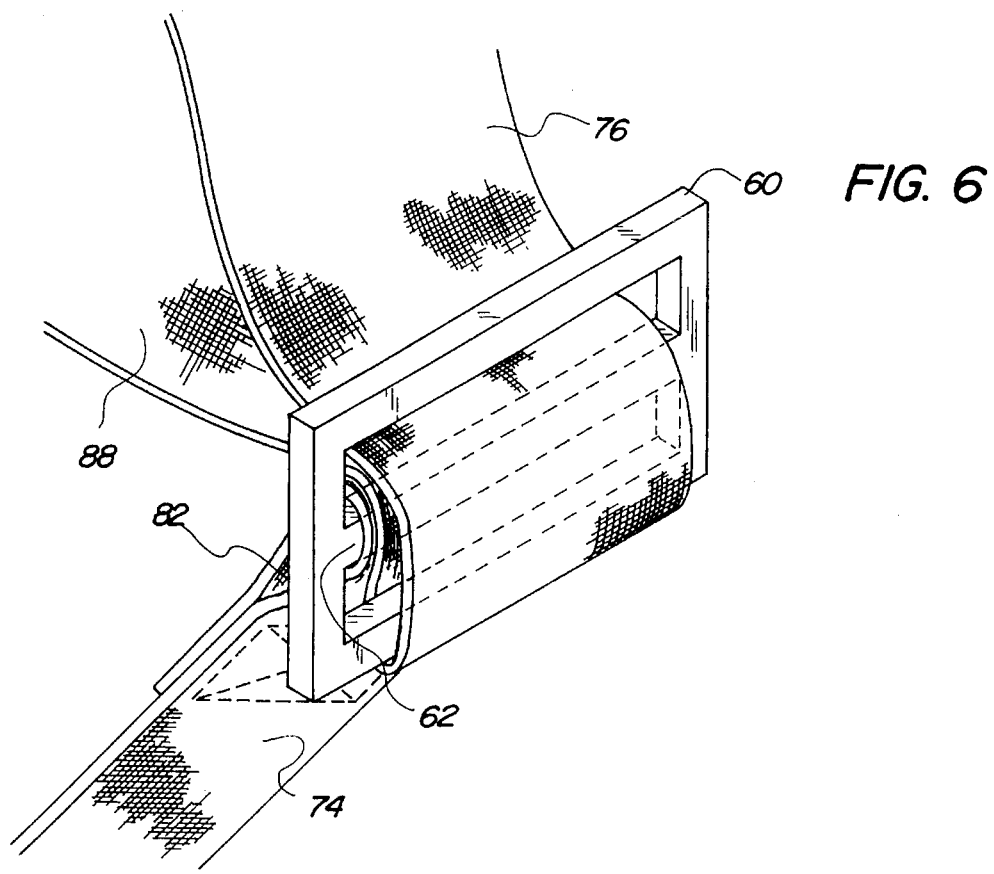
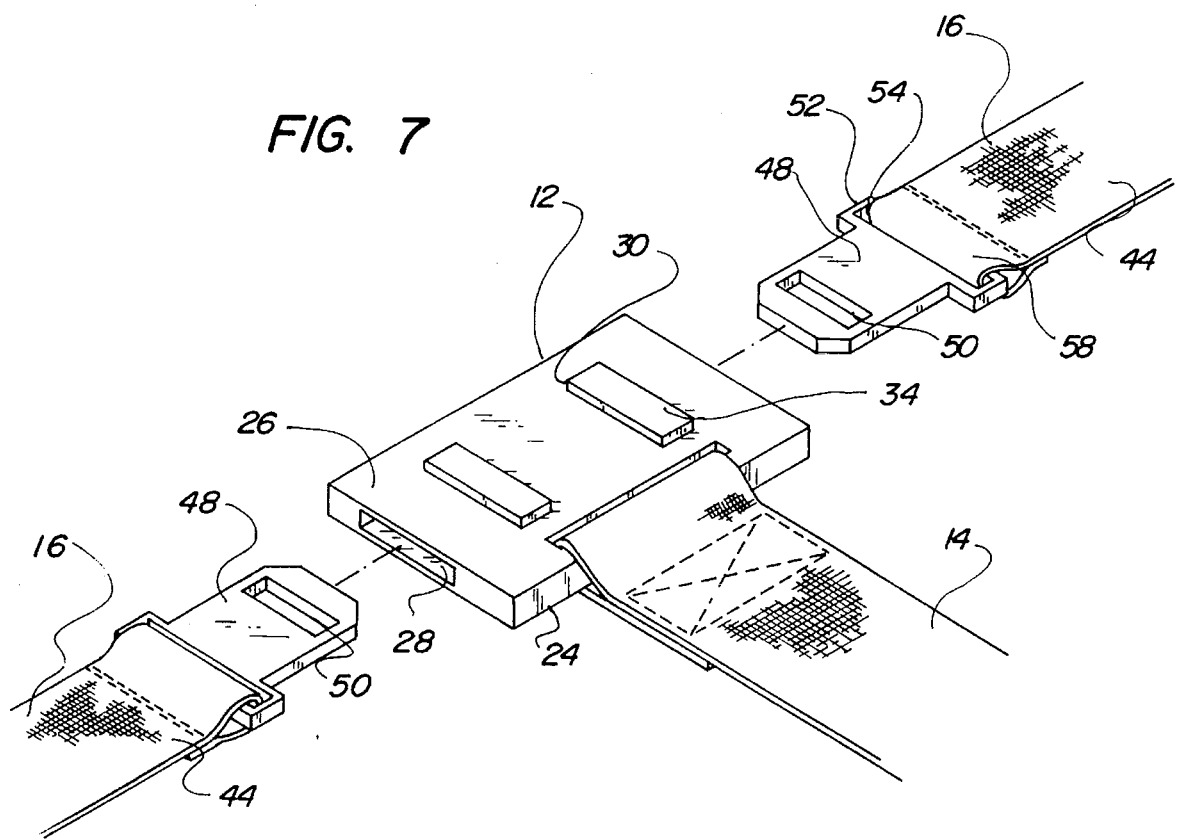

AIRPLANE SEAT CHILD SAFETY HARNESS

BACKGROUND OF THE INVENTION

1. Field of the Invention

The present invention relates to a airplane seat child safety harness and more particularly pertains to securing a child in the lap of an adult seated in an airplane seat.

2. Description of the Prior Art

The use of child restraint devices is known in the prior art. More specifically, child restraint devices heretofore devised and utilized for the purpose of securely restraining a child in the seat of a moving vehicle are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,063,879 to Vorbau a child restraint method and apparatus for aircraft and other vehicles.

U.S. Pat. No. 4,938,436 to Bradley discloses a safety harness and belt assemblies for aircraft crew members.

U.S. Pat. No. 5,118,163 to Brittian discloses a child restraint seat for an aircraft.

U.S. Pat. No. 4,666,017 to Zimmerman discloses a infant harness or the like.

Lastly, U.S. Pat. No. 5,232,263 to D'ull discloses a protective aircraft carrier for baby or small child.

In this respect, the airplane seat child safety harness according to the present invention substantially departs from the conventional concepts and designs of the prior art, and in doing so provides an apparatus primarily developed for the purpose of securing a child in the lap of an adult seated in an airplane seat.

Therefore, it can be appreciated that there exists a continuing need for a new and improved airplane seat child safety harness which can be used for securing a child in the lap of an adult seated in an airplane seat. In this regard, the present invention substantially fulfills this need.

SUMMARY OF THE INVENTION

In view of the foregoing disadvantages inherent in the known types of child restraint devices now present in the prior art, the present invention provides an improved airplane seat child safety harness. As such, the general purpose of the present invention, which will be described subsequently in greater detail, is to provide a new and improved airplane seat child safety harness and method which has all the advantages of the prior art and none of the disadvantages.

To attain this, the present invention essentially comprises a new and improved airplane seat child safety harness comprising, in combination: a central buckle formed in a planar generally rectangular configuration with an inner surface, an outer surface, long side edges and short side edges, each short side edge having a generally rectangular shaped bore extending therein, the front surface of the buckle having two rectangular shaped bores extending therein and joining with the bores in the short side edges, the central buckle having an aperture extending therethrough near its lower edge, two buttons being formed in a generally rectangular configuration with an inner surface and outer surface, the inner surface of each button including coupling means, the buttons being positioned in the bores of the outer surface of the buckle, the bores in the side edges adapted to couple with seat belt buckle inserts, the buttons causing the uncoupling of the inserts when depressed by the user; a lower belt formed in a long planar configuration with two free ends, one free end being coupled through the aperture in the central buckle, the lower belt adapted to be positioned through the legs, under the buttocks and behind the back of a child in the operative orientation; a first and a second lap belt, each lap belt having an inboard segment and an outboard segment, each segment having two free ends, two buckle inserts formed in a generally rectangular configuration, the inserts having a rectangular hole extending therethrough, one extent of each insert having an elongated width and a rectangular aperture extending therethrough, a free end of the inboard segment of each lap belt being coupled through the elongated aperture in the buckle, an adjustment clip being fabricated in a generally rectangular configuration with an open interior and a central cross bar extending thereaccross, the other free end of the inboard segment of each lap belt being coupled to the central cross bar of the clip; the outboard segments of the lap belts each having two free ends, two seat belt buckle connector rings being formed in a generally rectangular configuration with a hollow interior and rounded edges, the rings adapted to couple with the buckles and buckle inserts of standard airplane seat belts, one free end of each outboard segment being coupled to an adult seat belt buckle connector ring, the other free end being threaded through the adjustment clip in such a way as to permit the user to adjust the length of the strap, the buckle of each lap belt being coupled inside the central buckle in the operative orientation; and two shoulder straps formed in a long planar configuration with two free ends, each shoulder strap having two segments, each first segment having one free end coupled to the inboard segment of each lap belt adjacent to the buckles, each second segment having one free end coupled to the central crossbar of each adjustment clip, the second segment of each shoulder strap having one end coupled to the free end of the lower belt, the other end being threaded through the seat belt adjustor in such a way as to enable the user to adjust the length of the belt as desired, the positioning of the adjustable shoulder straps preventing pressure from being applied against the chest of the child during use, the apparatus enabling the adult user to comfortably strap a child on its lap while being seated in an airplane seat.

There has thus been outlined, rather broadly, the more important features of the invention in order that the detailed description thereof that follows may be better understood and in order that the present contribution to the art may be better appreciated. There are., of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved airplane seat child safety harness which has all of the advantages of the prior art child restraint devices and none of the disadvantages.

It is another object of the present invention to provide a new and improved airplane seat child safety harness which may be easily and efficiently manufactured and marketed.

It is further object of the present invention to provide a new and improved airplane seat child safety harness which is of durable and reliable constructions.

An even further object of the present invention is to provide a new and improved airplane seat child safety harness which is susceptible of a low cost of manufacture with regard to both materials and labor, and which accordingly is then susceptible of low prices of sale to the consuming public, thereby making such airplane seat child safety harness economically available to the buying public.

Still yet another object of the present invention is to provide a new and improved airplane seat child safety harness which provides in the apparatuses and methods of the prior art some of the advantages thereof, while simultaneously overcoming some of the disadvantages normally associated therewith.

Still another object of the present invention is to secure a child in the lap of an adult seated in an airplane seat.

Lastly, it is an object of the present invention to provide a new and improved an airplane seat child safety harness comprising: a central buckle formed in a planar configuration and including a coupling device affixed to at least one of its ends, the buckle including at least one bore with a button positioned therein, the coupling devices adapted to couple with seat belt buckle inserts, at least one lower belt having two free ends, one free end being coupled to the central buckle, the lower belts adapted to be positioned through the legs and behind the back of a child; and at least two lap belts each having at least two free ends, one free end being coupled to the central buckle, at least two seat belt rings formed in a tubular configuration and adapted to be coupled with the end of a seat belt buckle, the second free end of the lap belts being coupled to the seat belt buckle rings, each of the belts including length adjustment devices, at least two shoulder straps each having at least one segment and including length adjustment devices, each shoulder strap having two free ends, one free end being coupled to a lap belt, another free end being coupled to the free end of the lower belt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 1 and 2 are illustrations of prior art child restraint devices.

FIG. 6 is a broken away perspective view of the apparatus illustrating an adjustment clip component.

FIG. 7 is a perspective view of the central buckle of the apparatus.

The same reference numerals refer to the same parts through the various Figures.

DESCRIPTION OF THE PREFERRED EMBODIMENT

Figure 4:
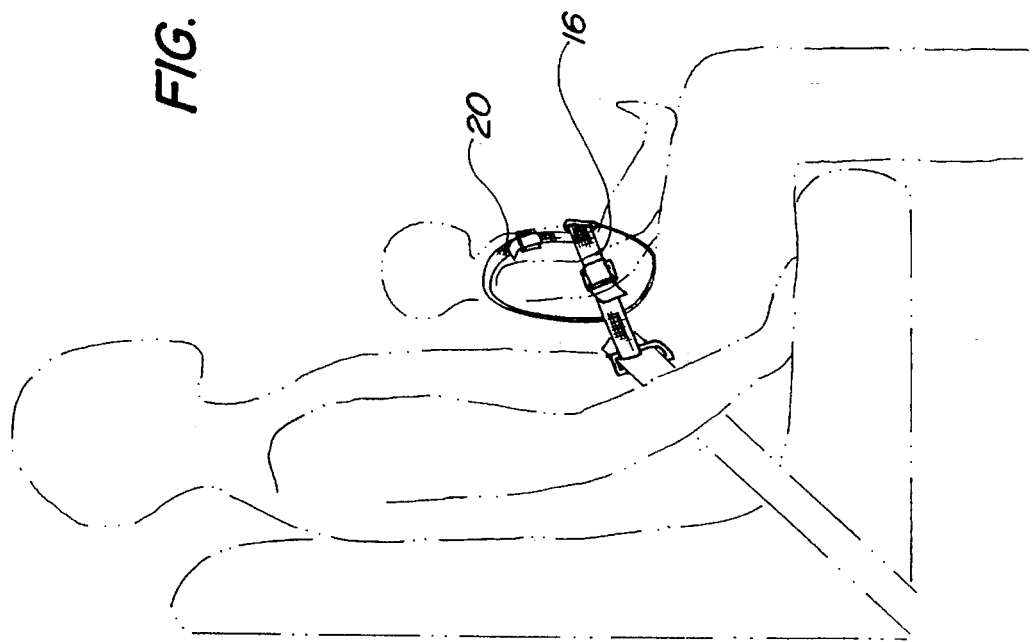
FIG. 4 is a side perspective view of the apparatus shown in FIG. 3.

With reference now to the drawings, and in particular to FIG. 1 thereof, the preferred embodiment of the new and improved airplane seat child safety harness embodying the principles and concepts of the present invention and generally designated by the reference numeral 10 will be described.

The present invention, the airplane seat child safety harness 10 is comprised of a plurality of components. Such components in their broadest context include a central buckle 12, a lower belt 14, two belts 16 and two shoulder straps 20. Such components are individually configured and correlated with respect to each other so as to attain the desired objective.

Figure 5:
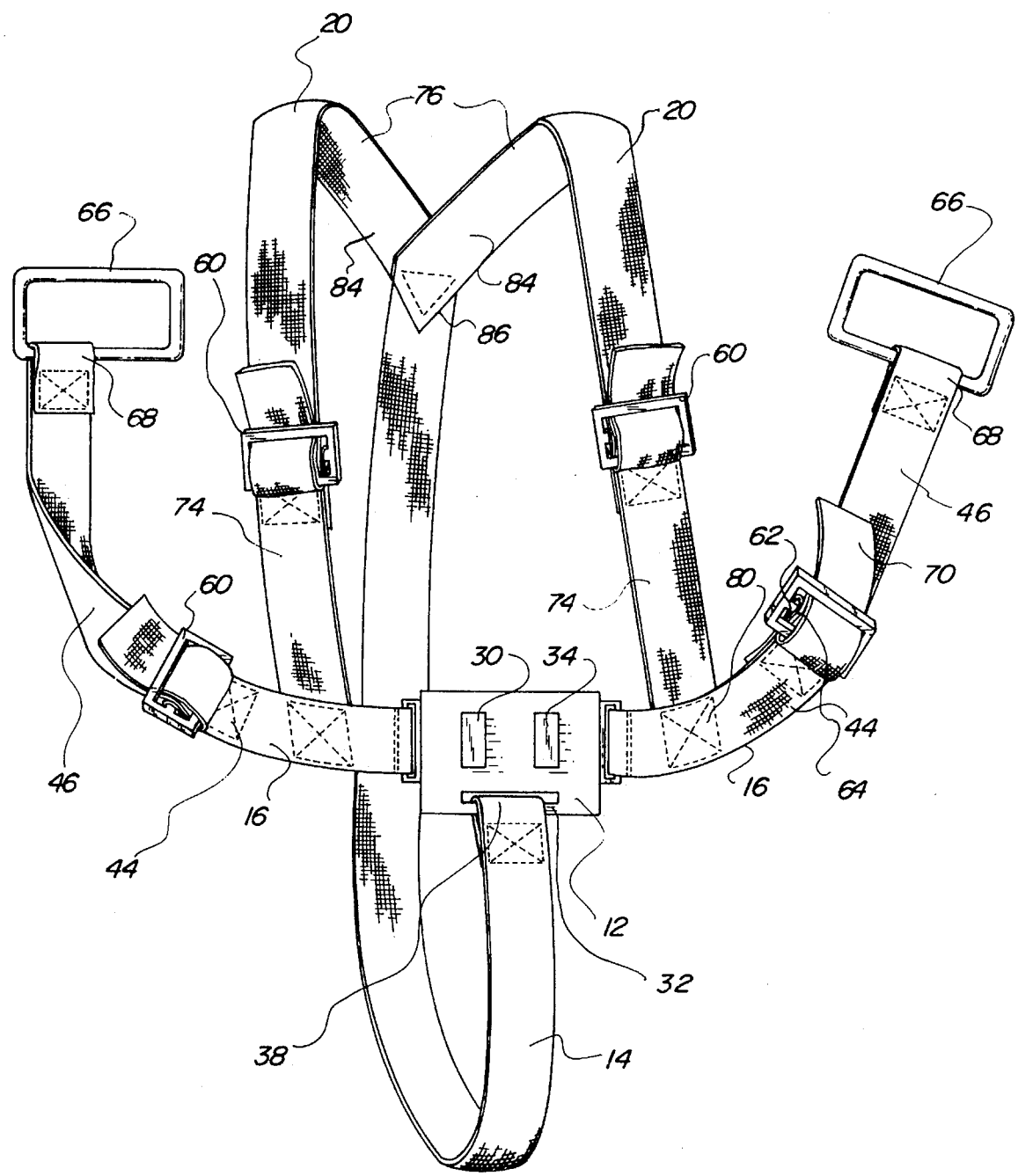
FIG. 5 is a perspective view of the apparatus shown in an orientation disconnected from the user.

More specifically, the central buckle 12 is formed in a planar generally rectangular configuration with a front surface 24, a rear surface 26, long side edges and short side edges. The rear surface of the buckle is positioned against the waist of the child in the operative orientation. Each short side edge has a generally rectangular shaped bore 28 extending within it. The bores are adapted to receive and retain lap belt buckle inserts in the operative orientation. The front surface 24 of the buckle has two rectangular shaped bores 30 extending within it and joining with the bores in the short side edges. The central buckle has an aperture 32 extending through it near its lower edge. Note FIGS. 5 and 7.

Two large buttons 34 are formed in a generally rectangular configuration with an inner surface and outer surface. The inner surface of each button includes coupling means. The coupling means serve to retain lap belt buckle inserts securely therein. The buttons are positioned in the bores of the outer surface of the buckle. Each button has a surface area between about fifteen and twenty percent of the surface area of the buckle. The buttons cause the uncoupling of the inserts when depressed by the user. The large and convenient size of the buttons enable the user to easily push and release one button at a time. When the buttons are depressed the lap belt buckle inserts may be easily slipped out of the central buckle. Note FIG. 7.

A lower belt 14 is formed in a long planar configuration with two free ends 38, 40. The belt is fabricated of sturdy and comfortable material to insure the safety and comfort of the child. One free end 38 is coupled through the aperture in the central buckle. The end is positioned through the aperture and folded back upon itself to form a loop. The loop is woven together to hold it in place. The lower belt is adapted to be positioned through the legs, under the buttocks and behind the back of a child in the operative orientation. The lower belt prevents the child from slipping underneath the apparatus during use. The tightness of the lower belt is altered by adjusting the length of the shoulder straps. Note FIGS. 1, 2 and 5.

Figure 3:
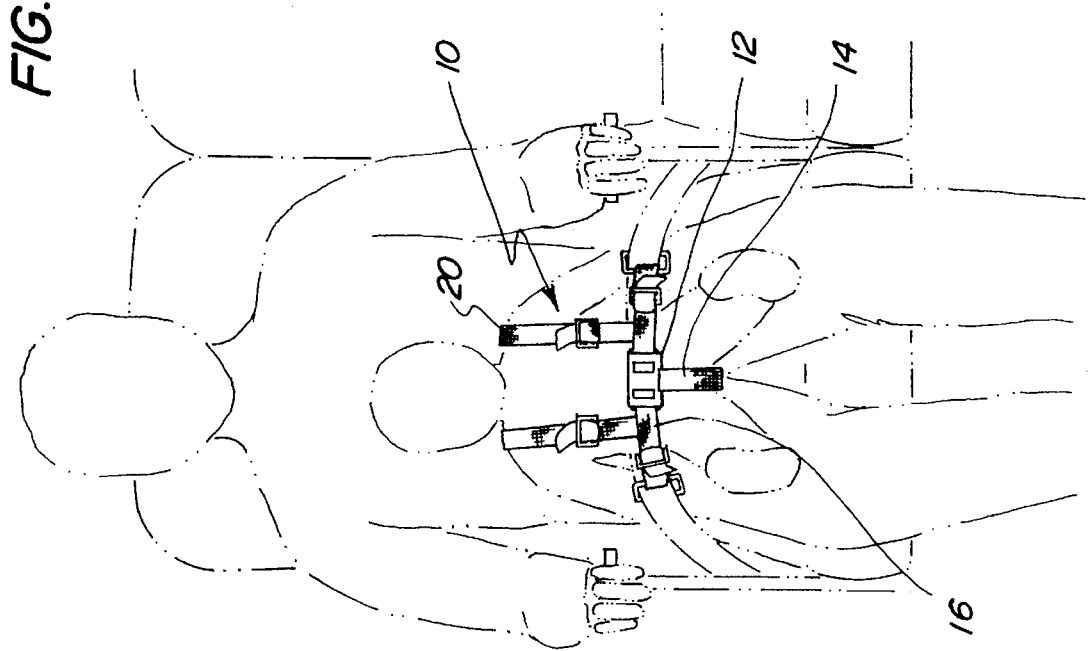
FIG. 3 is a perspective view of the preferred embodiment of the airplane seat child safety harness constructed in accordance with the principals of the present invention.

A first and a second lap belt 16 each have an inboard segment 44 and an outboard segment 46. The segments are coupled together by means of an adjustment clip. The clip permits users to adjust the lap belts to a plurality of different lengths. Each segment has two free ends. Two buckle inserts 48 are formed in a generally rectangular configuration. The inserts have rectangular holes 50 extending through them. The holes permit coupling with the inner surface of the buttons of the central buckle. One extent 52 of the insert has an elongated width and a rectangular aperture 54 extending through it. A free end 58 of the inboard segment of each lap belt is coupled through the elongated aperture 54 in each buckle. The end is positioned through the aperture and folded back upon itself to form a loop. The loop is woven together to hold it in place. Note FIGS. 3, 5 and 7.

A plurality of adjustment clips 60 are fabricated in a generally rectangular configuration with an open interior and a central cross bar 62 extending across it. The other free end 64 of the inboard segment of each lap belt is coupled to the central bar of the clip. A free end of the outboard segment of each lap belt is threaded through the clip to enable the user to adjust the length of the strap. Note FIG. 5.

The outboard segments 46 of the lap belts each have two free ends. Two seat belt buckle connector rings 66 are formed in a generally rectangular configuration with a hollow interior and rounded edges. The rings are adapted to couple with the buckles and buckle inserts of standard airplane seat belts. The rings are adapted to fit securely around the buckles and buckle inserts of the apparatus. One free end 68 of each outboard segment is coupled to an adult seat belt buckle connector ring. The other free end 70 is threaded through the adjustment clip in such a way as to permit the user to adjust the length of the strap. The buckle insert of each lap belt is coupled inside the central buckle in the operative orientation. Note FIGS. 4 and 5.

Two shoulder straps 20 are formed in a long planar configuration with two free ends. Each shoulder strap has two segments 74, 76. Each first segment 74 has one free end 80 coupled to the inboard segment of each lap belt 16 adjacent to the buckles. The strap is woven together with the inboard segment of the lap belt at about the approximate mid point of the segment. Note FIGS. 3 and 5.

Each second segment 76 has one free end 82 and is coupled to the central cross bar of each adjustment clip. The second segment of each shoulder strap has one end 84 coupled to the free end 86 of the lower belt. The other end 88 is threaded through the seat belt adjustor in such a way as to enable the user to adjust the length of the belt as desired. The adjustability of the shoulder straps is an important feature of the invention in that it provides a secure fit around the child while providing comfort as well. Note FIGS. 3 and 6.

The apparatus enables the adult user to comfortably strap a child on its lap while being seated in an airplane seat. The positioning of the adjustable shoulder straps prevent pressure from being applied against the chest of the child during use. Such pressure to the chest could damage the internal organs of the child. The properly adjusted shoulder straps will remain firmly in place around the child's shoulders during turbulent flying or landing conditions. This configuration diverts pressure to the sturdy shoulders of the child where the most pressure can be tolerated. The apparatus enables the adult user to comfortably strap a child on its lap while being seated in an airplane seat. Note FIGS. 3 and 4.

The airplane seat child safety harness is attached to the free ends of an airplane seat belt in the operative orientation. The apparatus secures a small child or infant on the lap of an adult while positioned in an airplane seat. The apparatus consists of belts and straps which fasten around the existing airplane seat belt and shoulders of the infant or toddler. Rings at each end of the lap belts are adapted to couple with the buckles and buckle inserts of airplane belts.

Two straps, similar in appearance to suspender straps, extend from the front of the central buckle and adjust over the shoulders and back of the child. The shoulder straps couple with the single lower belt of the apparatus which is permanently secured to the central buckle. The apparatus is designed to be used with the child seated on the lap of an adult.

When using the apparatus the first is to fasten the rings of the lap belts around the ends of the existing airplane seat belt buckles. The adult then places the child onto his/her lap. With the child facing forward, the belts and straps are then positioned around the child. The lad belt buckle inserts are then coupled inside the central buckle.

The two shoulder straps are adjusted to fit the child, ensuring that he/she is secured in the appropriate seated position. To remove the child from the harness, the central buckle is simply unclasped and the straps pulled over and away from the child. The apparatus is a practical safety device which aids in protecting small children from injury when excessive turbulence or less severe crashes occur while flying within the aircraft.

The cost of implementing the apparatus on airplanes would be negligible to the airline industry. The FAA is concerned with consumers paying an extraordinary sum of money if they regulate the use of a child seat requiring a full sized airplane seat. Although a major airplane crash could potentially have no survivors, the present invention would increase the odds of survival during turbulence, bad landings, or less severe crashes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved airplane seat child safety harness comprising, in combination:

a central buckle formed in a planar generally rectangular configuration with a front surface, a rear surface, long side edges and short side edges, each short side edge having a generally rectangular shaped bore extending therein, the front surface of the buckle having two rectangular shaped bores extending therein and joining with the bores in the short side edges, the central buckle having an aperture extending therethrough near its lower edge, two large buttons being formed in a generally rectangular configuration with an inner surface and outer surface, the inner surface of each button including coupling means, each button having a surface area between about fifteen and twenty percent of the surface area of the buckle, the buttons being positioned in the bores of the front surface of the buckle, the bores in the side edges adapted to couple with seat belt buckle inserts, the large size of the buttons allowing the user to easily push and release one button at a time, the buttons causing the uncoupling of the inserts when depressed by the user;

a lower belt formed in a long planar configuration with two free ends, one free end being positioned through the aperture in the central buckle and folded back upon itself to form a woven loop, the lower belt adapted to be positioned through the legs, under the buttocks and behind the back of a child in the operative orientation;

a first and a second lap belt, each lap belt having an inboard segment and an outboard segment, each segment having two free ends, two buckle inserts formed in a generally rectangular configuration, the inserts having a rectangular hole extending therethrough, one extent of each insert having an elongated width and a rectangular aperture extending therethrough, a free end of the inboard segment of the lap belts being positioned through the elongated apertures in the buckle, the free end folded back upon itself to form a woven loop, adjustment clips being fabricated in a generally rectangular configuration with an open interior and a central cross bar extending thereacross, the other free end of the inboard segment of each lap belt being coupled to the central bar of the clip;

the outboard segments of the lap belts each having two free ends, two seat belt buckle connector rings being formed in a generally rectangular configuration with a hollow interior and rounded edges, the rings adapted to securely couple with the buckles and buckle inserts of standard airplane seat belts, one free end of each outboard segment being coupled to an adult seat belt buckle connector ring, the other free end being threaded through the adjustment clip in such a way as to permit the user to adjust the length of the strap, the buckle insert of each lap belt being coupled inside the central buckle in the operative orientation; and two shoulder straps formed in a long planar configuration with two free ends, each shoulder strap having two segments, each first segment having one free end woven to the inboard segment of each lap belt adjacent to the buckles, each second segment having one free end coupled to the central crossbar of each adjustment clip, the second segment of each shoulder strap having one end coupled to the free end of the lower belt, the other end being threaded through the seat belt adjustor in such a way as to enable the user to adjust the length of the belt as desired, the positioning of the adjustable shoulder straps preventing pressure from being applied against the chest of the child during use, the apparatus enabling the adult user to comfortably strap a child on its lap while being seated in an airplane seat.

\* \* \* \* \*